(12) United States Patent
Miyamoto (10) Patent No.: US 7,440,366 B2
(45) Date of Patent: Oct. 21, 2008

(54) OPTICAL DISK DRIVE FOR DRIVING COPY-CONTROLLED CD

(75) Inventor: Takashi Miyamoto, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 889 days.

(21) Appl. No.: 10/891,547

(22) Filed: Jul. 15, 2004

(65) Prior Publication Data

US 2005/0013224 A1 Jan. 20, 2005

(30) Foreign Application Priority Data

Jul. 18, 2003 (JP) .............................. 2003-198933

(51) Int. Cl.
*G11B 5/09* (2006.01)
(52) U.S. Cl. ............... 369/47.14; 369/47.23; 369/53.13
(58) Field of Classification Search .............. 369/124.1, 369/124.01, 53.13, 47.14, 47.23, 47.12, 275.3, 369/47.24, 53.2, 53.21, 44.33, 30.04; 380/200, 380/202; 705/52
See application file for complete search history.

(56) References Cited

U.S. PATENT DOCUMENTS

| | | | | |
|---|---|---|---|---|
| 5,513,260 A | * | 4/1996 | Ryan | 380/200 |
| 5,596,639 A | * | 1/1997 | Kikinis | 705/52 |
| 6,636,689 B1 | * | 10/2003 | Stebbings | 386/94 |
| 2004/0179449 A1 | * | 9/2004 | McGoldrick | 369/53.22 |
| 2004/0228239 A1 | | 11/2004 | Okamoto | |

FOREIGN PATENT DOCUMENTS

| | | |
|---|---|---|
| JP | 3405980 B2 | 3/2003 |
| JP | 2003132633 | 5/2003 |
| JP | 2004-246997 A | 9/2004 |
| JP | 2004-259321 A | 9/2004 |
| WO | WO 00/74053 A1 | 12/2000 |
| WO | WO 01/80546 A2 | 10/2001 |

OTHER PUBLICATIONS

Notice of Grounds for Rejection (JP) dated Apr. 1, 2008, issued in corresponding Japanese Application No. 2003-198933.

* cited by examiner

*Primary Examiner*—Ali Neyzari
(74) *Attorney, Agent, or Firm*—Christenson O'Connor Johnson Kindness PLLC (57) ABSTRACT

An optical disk drive for driving an out-of-specification disk such as a CCCD. When the out-of-specification disk, such as a CCCD (Copy-Controlled CD), is loaded in the optical disk drive, a system controller of the optical disk drive reads TOC data in a first session and TOC data in a second session. When a contradiction exists between the TOC data in the second session and the TOC data in the first session, the system controller deems the disk to be not a within-specification disk but an out-of-specification disk, thereby diminishing the number of retry operations for reading data or a retry time, and reading data by means of generating a synchronization bit SYNC through use of an internal counter.

9 Claims, 5 Drawing Sheets

| TrK | TYPE | Min : Sec : Frm |
|---|---|---|
| 01 | AUDIO | 00 : 02 : 00 |
| 02 | AUDIO | 03 : 27 : 27 |
| 03 | AUDIO | 07 : 26 : 57 |
| 04 | AUDIO | 11 : 00 : 57 |

Toc

Fig. 4B

| TrK | TYPE | Min : Sec : Frm |
|---|---|---|
| 05 | DATA | 00 : 02 : 00 |
| 01 | DATA | 03 : 22 : 22 |
| 02 | DATA | 05 : 30 : 47 |
| 03 | DATA | 06 : 10 : 50 |
| 04 | DATA | 08 : 40 : 57 |

Toc

Fig. 5 RELATED ART

```
14          22         16            18
 ↘           ↘          ↘             ↘
Trk        TYPE     Min : Sec : Frm   LBA

01         AUDIO     00 : 02 : 00     000000
02         AUDIO     03 : 27 : 27     015402
03         AUDIO     07 : 26 : 57     033357
04         AUDIO     11 : 00 : 57     049407
05         AUDIO     14 : 52 : 49     066799
       READ OUT : 18 : 00 : 57  ( LBA 82218 )   ← 20
                                            TOC
```

Fig. 6 RELATED ART

OPTICAL DISK DRIVE FOR DRIVING COPY-CONTROLLED CD

BACKGROUND OF THE INVENTION

1. Field of the Invention

The present invention relates to an optical disk drive, and more particularly, to reading of data from an out-of-specification CD such as a copy-controlled CD.

2. Related Art

In the field of a digital audio compact disk (CD-DA) that carries audio data and control data, there has been known a (copy protection) technique for reading data through use of an optical disk drive, such as a CD drive, provided in a personal computer (PC), and preventing copying of the data to another CD or the like. A CD having undergone such a technique is referred to as a copy-controlled CD (CCCD).

In order to prevent copying action, erroneous data or inaccurate data (hereinafter called false TOC data) are generally recorded on a TOC (Table of Contents) where track information or the like is recorded. For instance, false data representing that a time—at which read-out operation is commenced—starts from zero have been recorded in the TOC in advance. An ordinary CD player can properly reproduce audio data by neglecting the false data. The optical disk drive built in the PC first reads the TOC data and hence "believes" the false data included in the TOC data, thereby immediately shifting from read-in operation to read-output operation. Thus, audio data cannot be read. Alternatively, AUDIO data showing audio data should originally be recorded in the TOC data. However, false "DATA" data showing digital audio are recorded in the TOC data to cause a controller of the optical disk apparatus to erroneously determine the audio data as digital data, thereby causing a read error.

There has also been proposed a method for dividing the CD into two sessions; i.e., a first session and a second session; recording normal data in a TOC of the first session and audio data; recording false data in a TOC of the second session; and recording, in the form of digital data, software and compressed files, which are specifically designed for causing the optical disk drive built in the PC to reproduce data.

Figure 5:
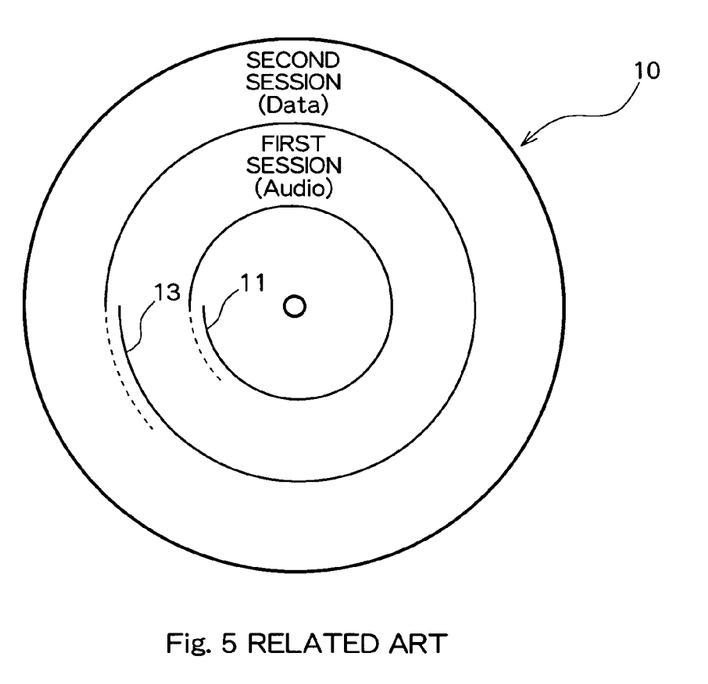
FIG. 5 is a descriptive view of a multi-session CD.

FIG. 5 shows the configuration of such a multi-session CD. A CD 10 is divided into a first session and a second session. Each session has a read-in area, a data area, and a read-out area. Data are usually recorded in the read-in area, the data area, and the read-out area in accordance with a red book standard, or a yellow book standard for expanding the red book standard. Data are divided on a per-frame basis, an done frame includes synchronization data SYNC, a sub-channel, data, and a parity. One sector is constituted of an aggregation of 98 frames, and a sub-channel block is constituted of sub-channel data included in the 98 frames in one sector. The sub-channel block includes Q data and the synchronization data SYNC showing the start of the sub-channel block. The Q data include a track number, a track start time, and the like. The Q data in the read-in area differ in format from the Q data in the data area and the read-out area, and the Q data in the read-in area impart the so-called TOC. The drawing shows the read-in area 11 in the first session and the read-in area 13 of the second session, and the TOCs of the respective sessions are recorded in these read-in areas 11, 13.

Figure 6:
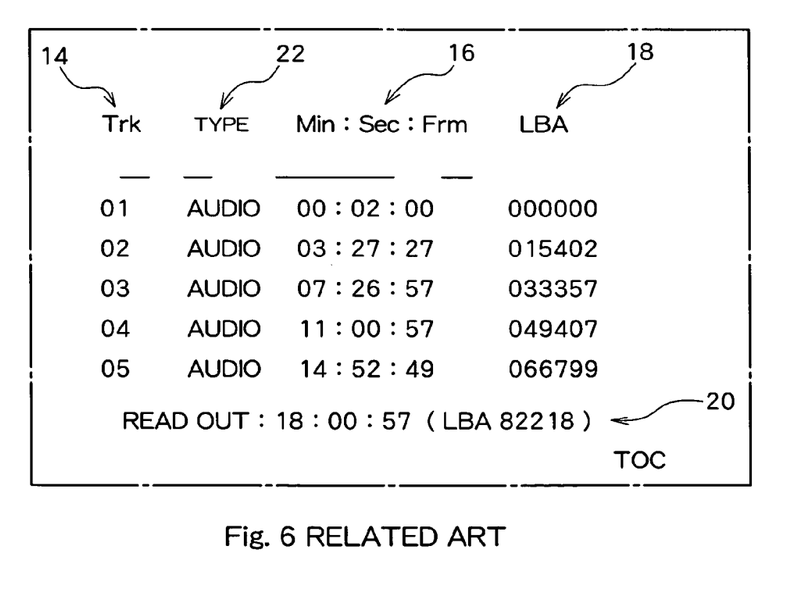
FIG. 6 is a descriptive view of TOC data.

FIG. 6 shows an example of the TOC data of the first session. The TOC data include a track number TrK 14, a data format 22, a start time (minutes Min and seconds Sec) of each track, a frame number Form 16, a logic block address LBA 18 computed from the absolute time, as well as a read-out start time and a logic block address 20.

The TOC data of the second session include false data. For instance, information items ranging from the first to fifth tracks are recorded in the TOC of the first session. Information items ranging from the second session to the sixth session should originally be recorded in the TOC of the second session. However, false data formats and start times of the first to fifth tracks of the first session are also recorded.

When data on such a CCCD are reproduced by an ordinary CD player, audio data pertaining to the first session are reproduced, thereby reproducing ordinary sound. When the data on the CCCD are reproduced by the optical disk drive built in the PC, reproducing operation is performed by reading the custom-designed software and compressed files, which correspond to digital data recorded in the second session.

When an attempt is made to copy the CCCD with the optical disk drive built in the PC, processing is performed on the basis of the false TOC data in the second session, thereby failing to read the audio data in the first session. Thus, retry is performed frequently, and consequently copying of the CCCD is prevented (the optical disk drive goes to read audio data as digital data while "believing" the false data format, thereby failing to find an appropriate header or synchronization data SYNC of the sector).

In relation to the CCCD, there is also practiced recording of data by intentionally offsetting synchronization data SYNC included in the sub-channel. In this case, the timing at which data are to be read is offset, and hence reproduction of data from the copied CD results in generation of sounds having a high level of noise. Japanese Patent No.3405980 describes a CCCD.

Even when a user desires to duplicate a CD for only private purposes and retain the resultant copy for backup, the CCCD cannot be copied, whereby the user's convenience is deteriorated.

SUMMARY OF THE INVENTION

The present invention provides an optical disk drive which enables reading of data from a CD when a user desires to legitimately duplicate the CD.

The present invention provides an optical disk drive for reading data from a digital audio compact disk, comprising:

means for reading TOC data on the digital audio compact disk;

detection means for detecting that false data are included in the TOC data; and processing means which, when the false data are included in the TOC data, deems the digital audio compact disk to be an out-of-specification disk and performs reading operation differing from that performed in the case of a within-specification disk whose TOC data are normal. The TOC data are to accurately record track information, such as a track number, a data format, and a track start time. However, in the case of the out-of-specification disk, these information items are recorded erroneously. According to the present invention, when data which are not present originally are included in the TOC data, the TOC data are deemed to be false data, and another reading operation is performed without performing reading operation analogous to that performed in the case of the within-specification disk.

Reading of data from the out-of-specification disk is performed by means of changing, e.g., a (default) parameter to be used for reading data from a within-specification disk. Such a parameter includes a retry time or the number of retry operations, which are required when a read error has arisen. When an attempt is made to read data in accordance with the faulty TOC data, data cannot be read accurately, and retry operation arises at a high frequency. However, the optical disk apparatus addresses the out-of-specification disk by limiting the retry operation.

When synchronization information is erroneously recorded in the out-of-specification disk, data are read not totally on the basis of the synchronization information in the disk but by means of generating synchronization data different from those in the disk.

The invention will be more clearly comprehended by reference to the embodiment provided below. However, the scope of the invention is not limited to the embodiment.

DETAILED DESCRIPTION OF THE PREFERRED MBODIMENT

An embodiment of the present invention will be described hereunder by reference to the drawings while a multi-session CCCD is taken as an example.

Figure 1:
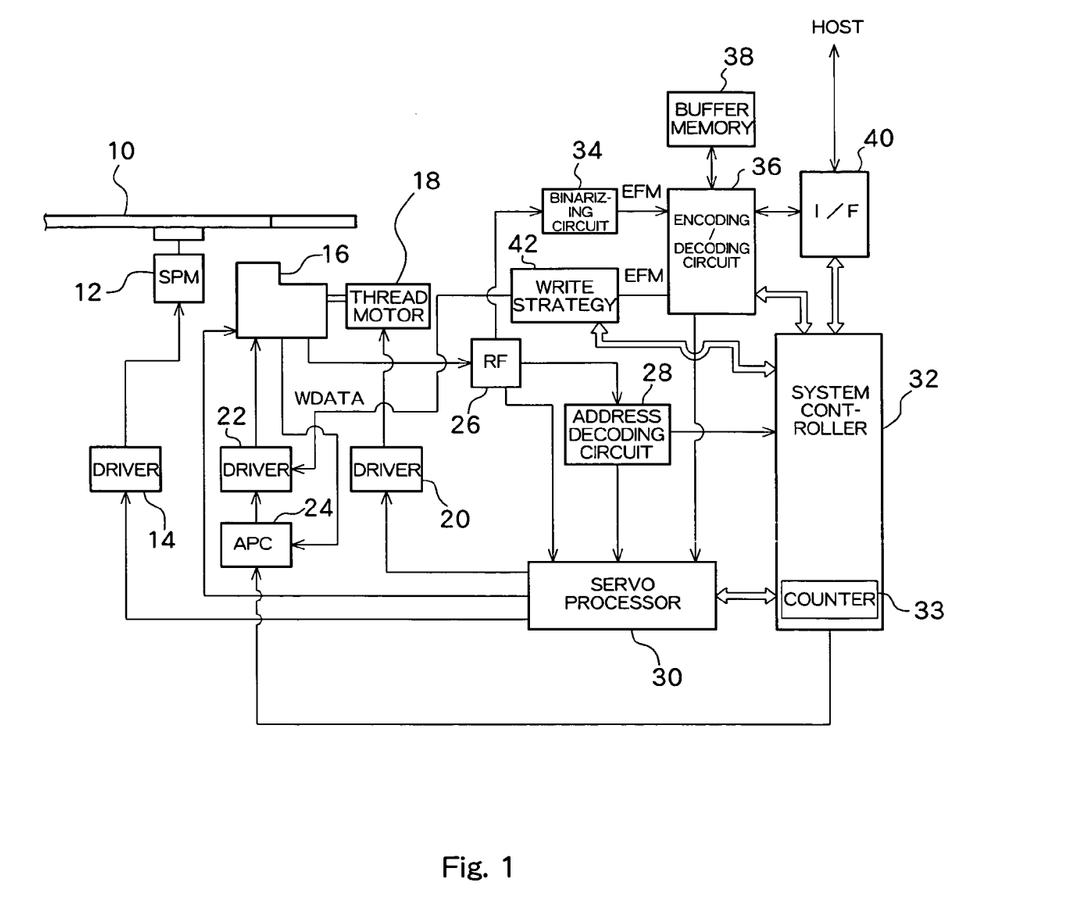
FIG. 1 is an overall block diagram of an optical disk apparatus according to an embodiment of the present invention.

FIG. 1 is an overall block diagram of an optical disk apparatus according to an embodiment of the present invention. The multi-session CCCD 10 shown in FIG. 5 is rotationally driven by a spindle motor (SPM) 12. The spindle motor SPM 12 is driven by a driver 14, and the driver 14 is subjected to servo control performed by a servo processor 30 such that a desired rotational speed is attained.

An optical pickup 16 includes a laser diode (LD) for radiating a laser beam onto an optical disk 10, and a photodetector (PD) which receives the light reflected from the optical disk 10 and converts the thus-received light into an electrical signal. This optical pickup 16 is disposed opposite the optical disk 10. The optical pickup 16 is driven by a thread motor 18 in a radial direction of the optical disk 10, and the thread motor 18 is driven by a driver 20. The driver 20 is subjected to the servo control performed by the servo processor 30, as in the case of the driver 14. The LD of the optical pickup 16 is activated by a driver 22, and the driver 22 is controlled such that a drive current attains a desired value by means of an auto power control circuit (APC) 24.

When the data recorded on the optical disk 10 are reproduced, a laser beam of reproducing power is radiated from the LD of the optical pickup 16, and the reflected light of the laser beam is converted into an electrical signal by the PD, whereby the electrical signal is output. The reproduced signal output from the optical pickup 16 is supplied to an RF circuit 26. The RF circuit 26 generates a focus error signal or a tracking error signal from the reproduced signal and supplies the generated signal to the servo processor 30. On the basis of the error signal, the servo processor 30 servo-controls the optical pickup 16, thereby maintaining the optical pickup 16 in an on-focus state and an on-track state. The RF circuit 26 supplies an address signal included in the reproduced signal to an address decoding circuit 28. The address decoding circuit 28 demodulates address data in the optical disk 10 from the address signal and supplies the demodulated address data to the servo processor 30 and a system controller 32.

The RF circuit 26 supplies the reproduced RF signal to a binarizing circuit 34, as well. The binarizing circuit 34 binarizes the reproduced signal and supplies a resultantly-generated EFM signal to an encoding/decoding circuit 36. The encoding/decoding circuit 36 subjects the binarized signal to EFM demodulation and error correction, to thus generate reproduced data, and outputs the reproduced data to a host machine, such as a personal computer, by way of an interface I/F 40. When the reproduced data are output to the host machine, the encoding/decoding circuit 36 outputs the reproduced data after having temporarily stored the reproduced data in buffer memory 38.

In the case of a combo drive in which the optical disk drive reproduces a CD but also can drive a data-recordable optical disk, such as a CD-R or a DVD-R, the drive also has a data recording-and-processing system. The recording system will also be described briefly hereinbelow. When data are recorded on the optical disk 10, the data to be recorded, which have been supplied from the host machine, are supplied to the encoding/decoding circuit 36 by way of the interface I/F 40. The encoding/decoding circuit 36 stores the data to be recorded in the buffer memory 38, encodes the data to be recorded, and supplies the thus-encoded data to a write strategy circuit 42 as EFM data or 8-16 modulated data. The write strategy circuit 42 converts the EFM data into a multipulse (a pulse train) in accordance with a predetermined recording strategy and supplies the multipulse to the driver 22 as record data. The laser beam whose power has been modulated by the record data is emitted from the LD of the optical pickup 16, thereby recording data on the optical disk 10. After recording of the data, the optical pickup 16 emits the laser beam of reproducing power to thus reproduce the record data and supplies the reproduced record data to the RF circuit 26. The RF circuit 26 supplies a reproduced signal to the binarizing circuit 34, which supplies the binarized EFM data or 8-16 modulated data to the encoding/decoding circuit 36. The encoding/decoding circuit 36 decodes the EFM data or the 8-16 modulated data and checks the thus-decoded data against the record data stored in the buffer memory 38.

The system controller 32 controls individual sections of the optical disk drive, thereby reproducing the data recorded on the CCCD 10. Specifically, when the CCCD 10 is loaded on the spindle motor 12, the optical pickup 16 is driven to the read-in area of the CCCD 10, to thus read the TOC data in the read-in area. In the case of an ordinary CD-DA, identification of the data as audio data is recorded in the data format of the TOC data. The system controller 32 acquires information about each track and reproduces audio data on the basis of the thus-acquired data. In the case of an ordinary CD-ROM, identification of the data as digital data is recorded in the data format of the TOC data, and the system controller 32 acquires information about each track and reads the digital data on the basis of the track information.

Meanwhile, in the case of the multi-session CCCD 10, the system controller 32 reads TOC data in the read-in area 11 of the first session and the TOC data in the read-in area 13 of the second session. By means of comparing the two TOC data sets with each other, the system controller 32 determines whether or not the TOC data in the second session are false data. When the TOC data in the second session have been detected as false data, the system controller 32 recognizes the CD which the system controller is about to reproduce not as a within-specification CD but as an out-of-specification CD;

i.e., a CCCD, and performs reading operation differing from within-specification processing. Specifically, in the case of a within-specification CD, retry is attempted three times, in consideration of a case where data cannot be read properly because of flaws or dust on the disk. However, when the CD is recognized as a CCCD, the number of retry operations is limited to only one. Alternatively, the retry time which is set to five seconds in the case where the within-specification CD is limited to one second when the CD is recognized as a CCCD.

As mentioned previously, there may be a case where the synchronization data SYNC are recorded in the CCCD with an intentional offset. For this reason, the system controller 32 does not read data on the basis of the synchronization data SYNC read from the disk but generates a synchronization timing through use of an internal counter of the system controller 32, thereby demodulating data.

Figure 2:
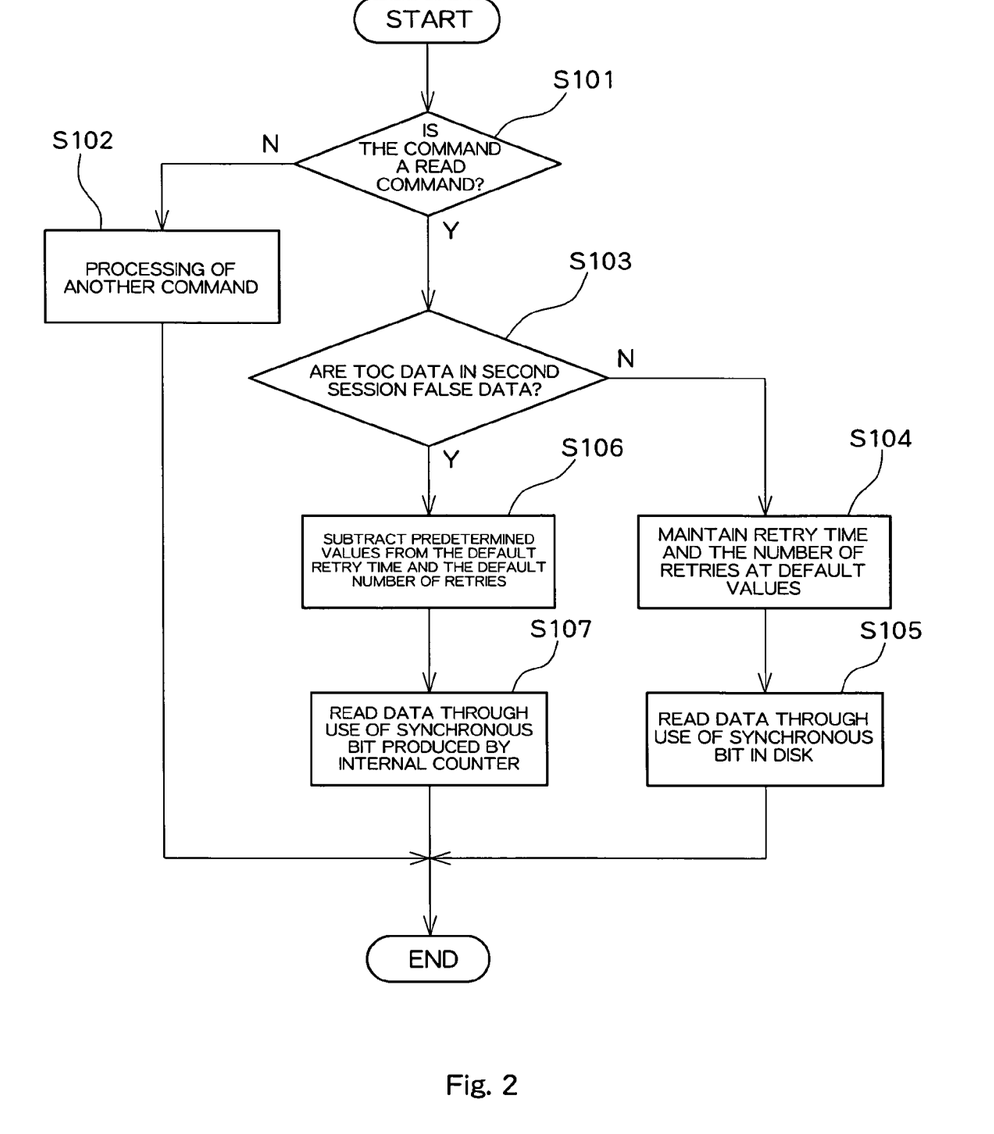
FIG. 2 is an overall processing flowchart of the embodiment.

FIG. 2 shows a processing flow chart of the embodiment. First, upon receipt of a command from the host machine, such as a PC, the system controller 32 determines whether or not the command is a read command for instructing reading of data (S101). When the command is determined not to be the read command, processing corresponding to the command is performed (S102).

When the command received from the host machine is a read command, the system controller 32 reads the TOC data in the first session and the TOC data in the second session, thereby determining whether or not the TOC data in the second session are false data (S103). This determination is performed by means of checking the track information included in the TOC data in the first session against the track information included in the TOC data in the second session.

Figure 3:
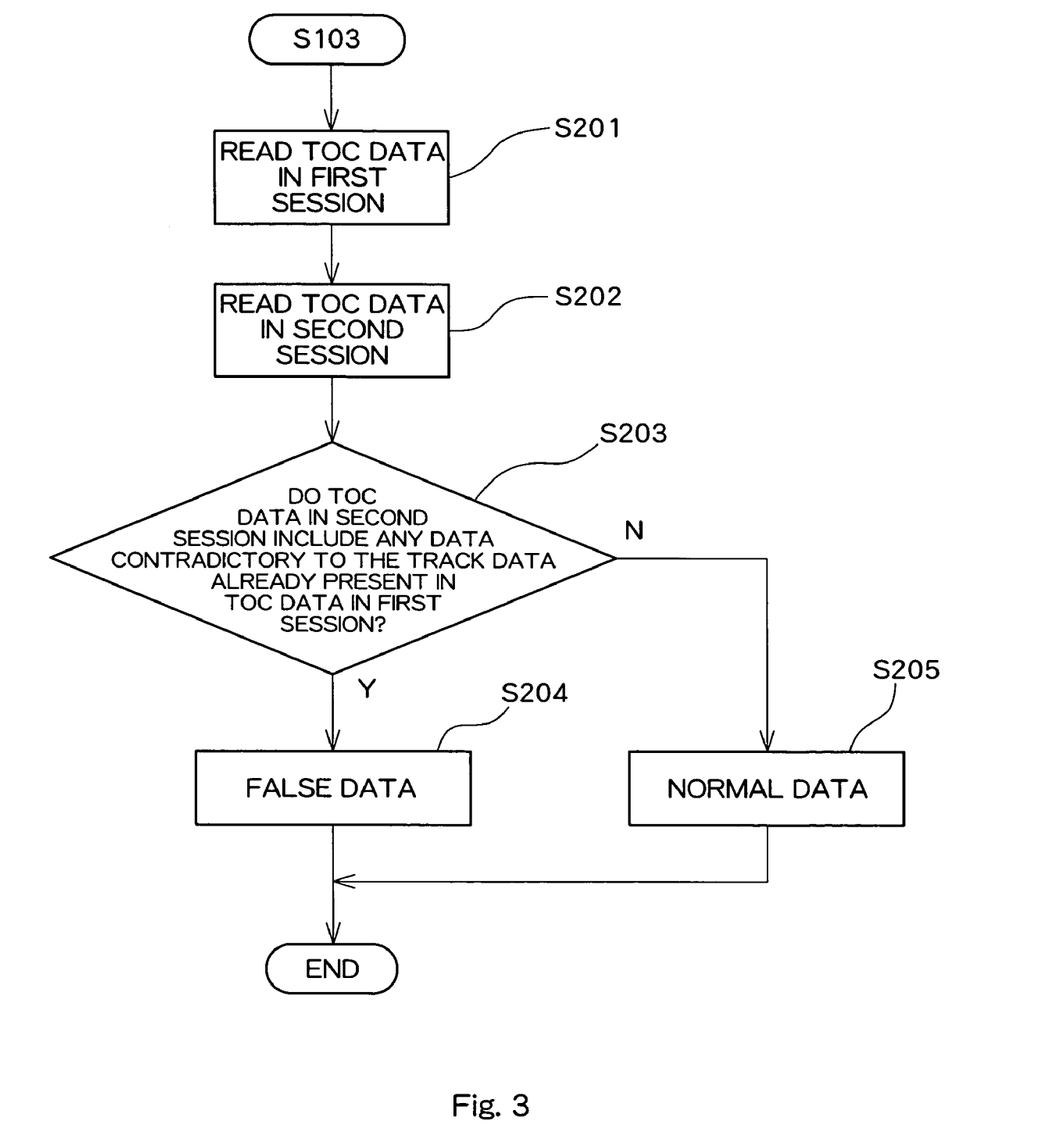
FIG. 3 is a processing flowchart pertaining to determination of the false data shown in FIG. 2.

FIG. 3 shows detailed processing pertaining to S103 shown in FIG. 2. First, the system controller 32 reads the TOC data in the first session of the CCCD 10 (S201). Subsequently, the system controller 32 reads the TOC data in the second session (S202). After having read both TOC data sets, the system controller 32 determines whether or not the track information having already been included in the TOC data in the first session is included in the TOC data in the second session in an overlapping manner, and when the track information items are present in an overlapping manner, the system controller 32 determines whether or not a contradiction exists between the track information items. Track information about the first session is usually erroneously recorded in the TOC data in the second session of the CCCD 10. For instance, the erroneously-recorded track information is that the data format of the first track of the first session is digital data; a different start time; or the like. When the track information included in the TOC data in the first session again appears in the TOC data in the second session and when a contradiction exists between the track information items, the system controller 32 detects the track information specified by the TOC data in the second session as being false data (S203, S204).

When the track information included in the TOC data in the first session is not included in the TOC data in the second session, the TOC data in the second session are determined to be normal data rather than to be false data (S205). When the TOC data have been determined to be normal, the disk is determined to be a within-specification disk rather than to be a CCCD.

Turning back to FIG. 2, when a determination is made as to whether or not the TOC data in the second session are false data and when the TOC data are determined not to be false data; i.e., when the disk is determined to be a within-specification disk, the system controller 32 performs ordinary reading operation. In a word, audio data in the first session and audio data in the second session are sequentially read in accordance with the TOC data in the first session and the TOC data in the second session. At this time, the retry time or the number of retry operations is maintained at a default value (e.g., the retry time is set to five seconds, or the number of retry operations is set to five) (S104). Data are sequentially read while frame synchronization is established through use of the synchronization bit SYNC included in the disk (S105).

When the TOC data in the second session have been determined to be false data in view that a contradiction exists between the TOC data in the second session and the TOC data in the first session, the system controller 32 reduces the retry time or the number of retry operations from the default value by a predetermined amount (S106). For instance, the retry time is shortened to one second from a default value of five seconds, or the number of retry operations is reduced to one time from a default value of five times. As a result, even when the audio data in the first session are erroneously believed to be digital data in view of the TOC data in the second session, a limitation is imposed on the retry time or the number of retry operations. Hence, repeated retry operations to read data are prevented, and data can be read within a short period of time by means of interpolation or the like processing. Of the track information items of the TOC data in the second session, the track information item contradicting the TOC data in the first session may be disregarded uniformly, and data may be read on the basis of only the TOC data in the first session. In the case of the CCCD 10, there may be a case where the synchronization bit SYNC is intentionally offset. Hence, the system controller 32 reads data not on the basis of only the SYNC bit of the disk but along with the synchronization timing generated by an internal counter 33 (S107). Specifically, tracing operation of the optical pickup 16 is started from a portion of the CCCD 10 having a normal SYNC bit, and the internal counter 33 is operated. Subsequently, the synchronization bit SYNC is deemed to be present at a timing counted by the internal counter 33 without depending on the SYNC data in the CCCD, and data are read while establishing synchronization at this timing. As a result, there can be prevented occurrence of reproduction noise, which would otherwise be caused when data are read in accordance with the intentionally-offset SYNC.

Figure 4A:
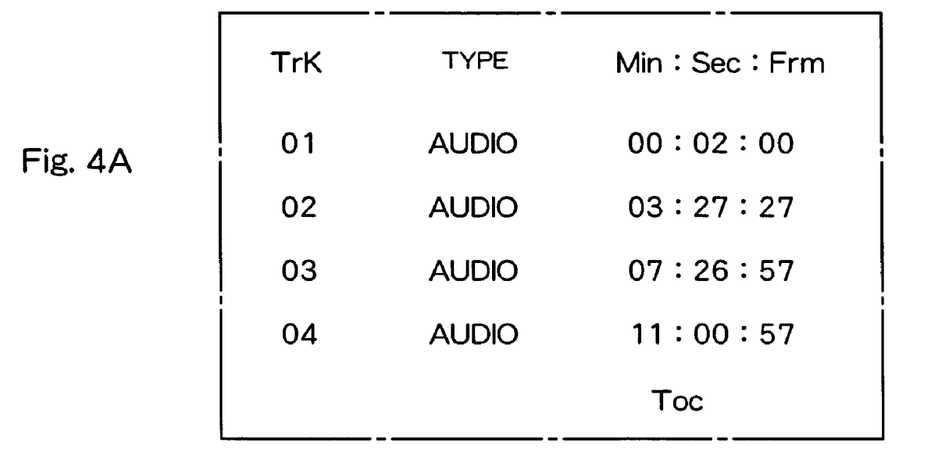
FIG. 4A is a descriptive view of TOC data in the first session of a multi-session CCCD.
Figure 4B:
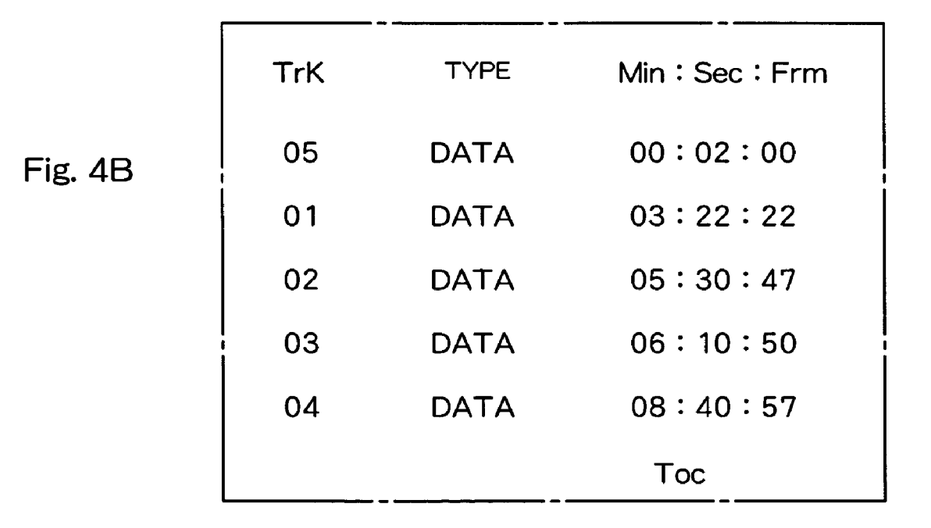
FIG. 4B is a descriptive view of TOC data in the second session of the multi-session CCCD.

FIGS. 4A, 4B show an example of the TOC data in the first session of the CCCD 10 and an example of the TOC data in the second session of the same. The first through fourth tracks are present in the first session, and data formats (audio data) and start times of the respective tracks are recorded in the TOC data. Meanwhile, the fifth track is present in the second session, and a player program and compressed file data are recorded in the TOC data in the fifth track of the second session. Track information items about the first through fourth tracks existing in the first session as well as the fifth track information are recorded in that TOC data in the second session, and erroneous data pertaining to data formats and start times are recorded in the TOC data in the second session. If the system controller 32 of the optical disk drive returns the TOC data in the second session, in unmodified form, to the host machine in response to a read TOC command, the host machine encounters difficulty in issuing a read command to the first through fourth tracks, because contradictory information items are present in the first through fourth tracks. In the present embodiment, when a pattern of TOC data, such as that shown in FIG. 4, has appeared, the disk which the system controller 32 is about to read is detected as being an out-of-specification disk, such as a CCCD, and changes reading operation. Hence, data can be read within a short period of time such that noise stemming from reproduction of data is suppressed, and backup data can be obtained.

What is claimed is:

1. An optical disk drive for reading data from a digital audio compact disk, comprising:
   means for reading TOC data recorded on said digital audio compact disk;
   detection means for detecting that false data are included in said TOC data; and
   processing means which, when said false data are included in said TOC data, deems said digital audio compact disk to be an out-of-specification disk and performs reading operation differing from that performed in the case of a within-specification disk whose TOC data are normal.

2. The optical disk drive according to claim 1, wherein said digital audio compact disk is formed from a plurality of sessions;
   a plurality of said sessions each include said TOC data; and
   said detection means detects said false data to be included in said TOC data when a contradiction exists between any one TOC data set and another TOC data set, both belonging to a plurality of said sessions.

3. The optical disk drive according to claim 2, wherein said digital audio compact disk is formed from first and second sessions;
   said first session includes normal TOC data and audio data;
   said second session includes TOC data and digital data; and
   said detection means detects said TOC data in said second session to be false TOC data when a contradiction exists between track information included in said TOC data in the second session and track information included in said TOC data in said first session.

4. The optical disk drive according to claim 1, wherein said digital audio compact disk is formed from a plurality of sessions;
   a plurality of said sessions each include said TOC data; and
   said detection means detects said false data to be included in said TOC data on the basis of start track information and end track information, both being included in TOC data in a plurality of said sessions.

5. The optical disk drive according to claim 1, wherein, when said digital audio compact disk is said out-of-specification disk, said processing means reduces at least one of the number of retry operations and a retry time, which are to be performed when reading of data has ended in failure, as compared with that employed in the case of said within-specification disk.

6. The optical disk drive according to claim 1, wherein, when said digital audio compact disk is the out-of-specification disk, said processing means switches at least a portion of synchronization data included in said digital audio compact disk to synchronization data generated by an internal counter on the basis of a count thereof, to thus read data.

7. An optical disk drive which reads data from a digital audio compact disk and operates in accordance with a command from a computer, the optical disk drive comprising:
   said digital audio compact disk being formed from a plurality of sessions;
   a plurality of said sessions each including TOC data;
   TOC data reading means for reading TOC data from said digital audio compact disk;
   detection means which compares TOC data sets in a plurality of said sessions and detects that false TOC data are included when a contradiction exists between said TOC data sets; and
   data read means which, when reading data from said digital audio compact disk in a case where said false TOC data are included, reduces at least one of the number of retry operations and a retry time, which are to be performed when reading operation has ended in failure, as compared with a default value, to thus read said data.

8. An optical disk drive which reads data from a digital audio compact disk and operates in accordance with a command from a computer, the optical disk drive comprising:
   said digital audio compact disk being formed from a plurality of sessions;
   a plurality of said sessions each including TOC data;
   TOC data reading means for reading TOC data from said digital audio compact disk;
   detection means which compares TOC data sets in a plurality of said sessions and detects that false TOC data are included when a contradiction exists between said TOC data sets; and
   data read means which, when reading data from said digital audio compact disk in a case where said false data are included, reads said data by means of switching at least a portion of synchronization data included in said digital audio compact disk to synchronization data generated by an internal counter on the basis of a count thereof, to thus read data.

9. The optical disk drive according to claim 8, wherein said data read means activates said internal counter in synchronism with normal synchronization data (SYNC) of said digital audio compact disk and establishes synchronization at a timing counted by said internal counter, to thus read data.

* * * * *

UNITED STATES PATENT AND TRADEMARK OFFICE
CERTIFICATE OF CORRECTION

PATENT NO.         : 7,440,366 B2
APPLICATION NO.    : 10/891547
DATED              : October 21, 2008
INVENTOR(S)        : T. Miyamoto It is certified that error appears in the above-identified patent and that said Letters Patent is hereby corrected as shown below:

| On the title page item (74) | Attorney, Agent, or Firm | "Christenson" should read --Christensen-- |

Signed and Sealed this

Seventeenth Day of November, 2009

David J. Kappos
*Director of the United States Patent and Trademark Office*